(No Model.)

C. OBERLE & E. FALLER.
GAGE FOR SHEARS.

No. 497,412.  Patented May 16, 1893.

WITNESSES:

INVENTORS
Charles Oberle
Ernst Faller
BY
Edwin H. Brown
THEIR ATTORNEY

UNITED STATES PATENT OFFICE.

CHARLES OBERLE AND ERNST FALLER, OF NORTH TARRYTOWN, NEW YORK, ASSIGNORS TO MAX H. C. BROMBACHER, OF SAME PLACE.

GAGE FOR SHEARS.

SPECIFICATION forming part of Letters Patent No. 497,412, dated May 16, 1893.

Application filed August 13, 1892. Serial No. 443,059. (No model.)

*To all whom it may concern:*

Be it known that we, CHARLES OBERLE and ERNST FALLER, both of North Tarrytown, Westchester county, and State of New York, have invented a certain new and useful Improvement in Gages for Shears and other Articles, of which the following is a specification.

This improvement is especially applicable to shears used by tinsmiths for cutting what is commonly called sheet tin.

In certain machines of this type, it has been common to attach a gage to the knife head or stock, so that it will be carried thereby. These gages require very delicate adjustment, and, as they have been commonly constructed, a great deal of time has been required to effect their adjustment.

The object of our improvement is to provide a gage which may be adjusted accurately in a very expeditious manner.

We will describe a gage embodying our improvement and then point out the novel features in the claims.

Figure 1:
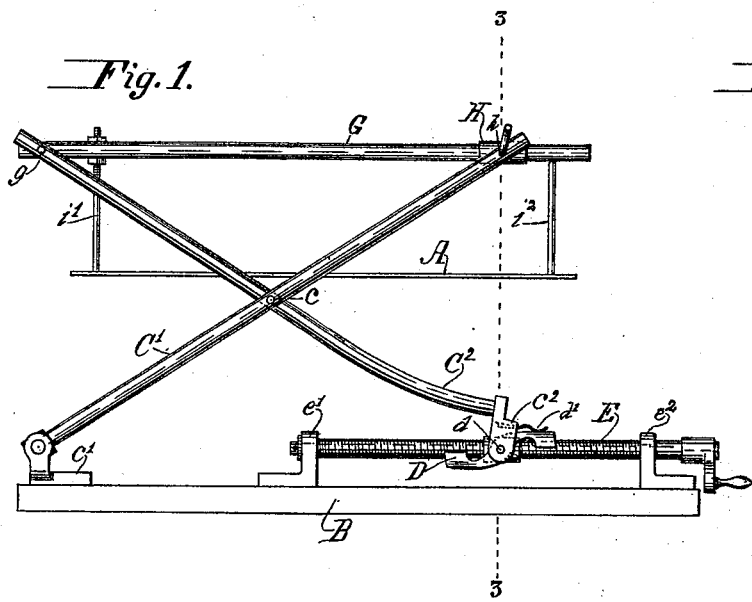
Figure 2:
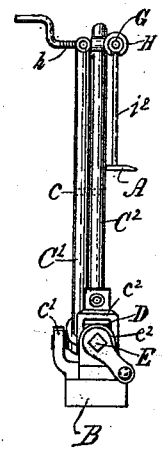
Figure 3:
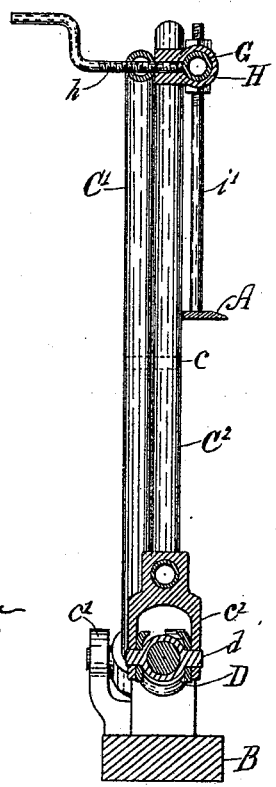

In the accompanying drawings, Figure 1 is a top view of a knife head, a gage and appurtenances. Fig. 2 is a side view. Fig. 3 is a transverse section taken at the plane of the dotted line 3 3 Fig. 1.

Similar letters of reference designate corresponding parts in all the figures.

A designates a gage. B designates a part from which said gage may be supported. In shears of a certain type, this part will be the knife head or stock, and will be fitted to work vertically in reciprocating ways.

Pivotally connected to the part B are two crossed rods $C'$ $C^2$, which are pivotally connected to each other by a pin $c$ at the point of crossing. These rods may advantageously be made of tubular construction, so as to be strong and withal, light. The rod $C'$ is pivotally connected at one end to a bracket $c'$, which is affixed to the part B. The part $C^2$ is connected to a yoke $c^2$, which is pivotally connected to a nut, D, that is constructed to engage with a screw E. The screw E extends parallel to the part B, and is journaled in brackets $e'$ $e^2$ extending from the part B. The nut D is intended to travel along the screw E. Preferably the nut D will be made so that it can be readily disengaged from the screw E. As here shown, the nut is for this purpose made in the form of a lever, which is pivoted by a pin $d$ within the yoke $c^2$. This lever is obliquely arranged and has its ends bent transversely so that they may rest on opposite sides of the screw. It has those portions which are opposite the screw E provided with screw segments, suitable for engaging with said screw. A spring $d'$ connected with the lever forming the nut D and also with the yoke $c^2$ tends to keep the lever in such position that its screw segments will engage with the screw E. Obviously, by disengaging the nut D from the screw E, the nut may then be slid freely along the screw to any desired point and then be transmitted to re-engage the screw. After the principal length through which it may at any time be desired to adjust the nut has been effected in this way, the adjustment of the remaining part of the required distance may be accomplished by allowing the nut to re-engage with the screw and then rotating the screw. In this way, any adjustment may be made quickly and yet very accurately. A hand crank is applied to the screw to facilitate its rotation. The pivotal point $c$ of the connection between the rods $C'$ $C^2$ must intersect each rod at the same distance from the part B. The free or outer ends of the rods $C'$ $C^2$ are connected with a bar G, the point of connection being made at the same distance from the point where the rods are pivoted together. We do not mean, however, that the rods must be the same length on opposite sides of the pivot whereby they are connected together. The rod $C^2$ is pivotally connected by a pin $g$ with the bar G. The rod $C'$ is not, however, connected directly with the bar G, but indirectly through a slide H, which embraces said bar G, so as to be capable of sliding along the latter. The bar G is, of course, pivotally connected to this slide. As here shown, a pivot, made in the form of a screw $h$ is passed through the rod $C'$, thence through a tapped hole in the slide H and impinges against the bar G. The advantage of making the pivot in this manner arises from the fact that then the slide may be clamped to the bar G after adjustment, this being advantageous for the reason that the bar G will be held more reliably than if the slide were free to move upon it under pressure, causing the bending of the rod C' or some other part. From the bar G two rods $i'$ $i^2$ extend. As here shown, these rods $i'$ $i^2$ extend toward the part B. At their free ends, they are fastened to the gage A and serve as the means of supporting it.

It will, of course, be understood that by adjusting the nut D along the screw E, both rods C' C² will be made to oscillate upon their pivotal connection, and that this will have the effect of moving the outer ends of the rods nearer to or farther from the part B. The adjustment of the outer ends of the rods C' C² nearer to or farther from the part B will, of course, have the effect of moving the bar G similarly, and in consequence of the movement of the bar G, the gage A will be adjusted toward and from the part B. The rocking of the rods C' C² could not occur were it not for the sliding connection which the rod C' has with the bar G.

What we claim as our invention, and desire to secure by Letters Patent, is—

1. The combination with a support, of crossed rods pivotally connected together and pivotally connected at their inner ends with the said support, one of said rods also having a sliding connection with the support, a bar with which the outer ends of said crossed rods are pivotally connected, said bar also having a sliding connection with one of said crossed rods and a gage supported by the bar, substantially as specified.

2. The combination with a support and crossed rods pivotally connected together and having a bar pivotally connected to their outer ends, said bar also having a sliding connection with one of said rods of a gage supported by the bar a pivotal connection between one of said rods and the said support, a screw sustained by said support, a nut engaging with said screw and a pivotal connection between said nut and one of the crossed rods, substantially as specified.

3. The combination with a support and crossed rods pivotally connected together and having a bar pivotally connected to their outer ends, said bar also having a sliding connection with one of said rods of a gage supported by said bar a pivotal connection between one of said rods and the said support, a screw sustained by said support, a nut capable of being engaged with and disengaged from said screw, and a pivotal connection between said nut and one of the crossed rods, substantially as specified.

4. The combination of a support, crossed rods pivotally connected together, a pivotal connection between one of these rods and the said suppport, a nut, a pivotal connection between the other crossed rod and said nut, a screw connected with said support and coacting with said nut, a bar with which the outer end of one of said crossed rods is pivotally connected, a slide fitted to said bar a pivotal connection between said slide and one of the crossed rods, and a gage supported by said bar substantially as specified.

5. The combination of a support, crossed rods pivotally connected together, a pivotal connection between one of these rods and the said support, a nut, a pivotal connection between the other crossed rod and said nut, a screw connected with said support and coacting with said nut, a bar with which the outer end of one of said crossed rods is pivotally connected, a gage supported by said bar a slide fitted to said bar, a pivotal connection between said slide and one of the crossed rods and a screw passing through one of the crossed rods, engaging with the slide and impinging against the bar, substantially as specified.

In testimony whereof we have signed our names to this specification in the presence of two subscribing witnesses.

CHARLES OBERLE.
ERNST FALLER.

Witnesses:
F. V. MILLARD,
MAX H. C. BROMBACHER.